(12) United States Patent
Vreeland

(10) Patent No.: US 8,974,665 B2
(45) Date of Patent: Mar. 10, 2015

(54) SEDIMENT FILTER SYSTEM FOR A STORM WATER PIPE

(76) Inventor: Gregory M. Vreeland, Springboro, OH (US)

(*) Notice: Subject to any disclaimer, the term of this patent is extended or adjusted under 35 U.S.C. 154(b) by 489 days.

(21) Appl. No.: 13/385,006

(22) Filed: Jan. 27, 2012

(65) Prior Publication Data
US 2013/0193045 A1 Aug. 1, 2013

(51) Int. Cl.
*E03F 5/14* (2006.01)
*E03F 1/00* (2006.01)
*B01D 29/15* (2006.01)

(52) U.S. Cl.
CPC ........... *E03F 5/14* (2013.01); *B01D 2201/0415* (2013.01); *E03F 1/00* (2013.01); *B01D 29/15* (2013.01)
USPC ...... 210/162; 210/170.03; 210/461; 210/463; 405/125

(58) Field of Classification Search
CPC ................. E03F 1/00; E03F 5/14; E03F 7/06; B01D 29/15; B01D 35/02; B01D 2201/0415; B01D 2221/12
USPC ......... 210/747.3, 162, 163, 170.03, 459, 460, 210/461, 463, 483, 489; 405/42, 124, 125, 405/127
See application file for complete search history.

(56) References Cited

U.S. PATENT DOCUMENTS

| | | | |
|---|---|---|---|
| 1,555,841 A | 10/1925 | Harris | |
| 3,086,655 A | 4/1963 | Compton | |
| 3,472,030 A * | 10/1969 | Rieke | 405/125 |
| 3,587,239 A | 6/1971 | Feland | |
| 4,713,179 A | 12/1987 | Goedderz, Sr. | |
| 5,102,537 A * | 4/1992 | Jones | 210/162 |
| 5,581,934 A * | 12/1996 | Arnold, Sr. | 210/460 |
| 6,004,457 A * | 12/1999 | Singleton | 210/163 |
| 6,334,953 B1 * | 1/2002 | Singleton | 210/460 |
| 6,447,206 B1 * | 9/2002 | Fleury | 405/125 |
| 6,682,651 B1 * | 1/2004 | Toland et al. | 210/162 |
| 6,749,746 B2 * | 6/2004 | Mokrzycki | 210/163 |
| 7,682,104 B2 | 3/2010 | Wassman et al. | |
| 2004/0045883 A1 * | 3/2004 | Miller, Jr. | 210/162 |
| 2009/0279954 A1 * | 11/2009 | Griffith et al. | 405/125 |

OTHER PUBLICATIONS

North Carolina Sediment Control Commission, Culvert Inlet Protection, STD & SPEC 3.08, 1992.
Illinois Urban Manual, Culvert Inlet Protection, Jan. 1999.

* cited by examiner

*Primary Examiner* — Christopher Upton
(74) *Attorney, Agent, or Firm* — Jacox Meckstroth & Jenkins

(57) ABSTRACT

A welded wire mesh is rolled into an elongated tubular wire frame, and sizing rings surround the tubular wire frame to maintain the tubular frame with a predetermined diameter. The wire frame is partially covered with a sediment filter fabric attached by wire clips, and an end portion of the tubular frame is inserted into an inlet portion of an installed storm water pipe. A collar member includes a wire collar frame secured to the tubular wire frame and is covered by a flexible filter material to filter storm water flowing between the tubular frame and the water pipe and to form a stop which prevents the tubular frame from moving further into the pipe. A top portion of the tubular wire frame is uncovered by filter fabric to define an overflow opening for storm water with very light sediment to flow into the storm water pipe.

10 Claims, 3 Drawing Sheets

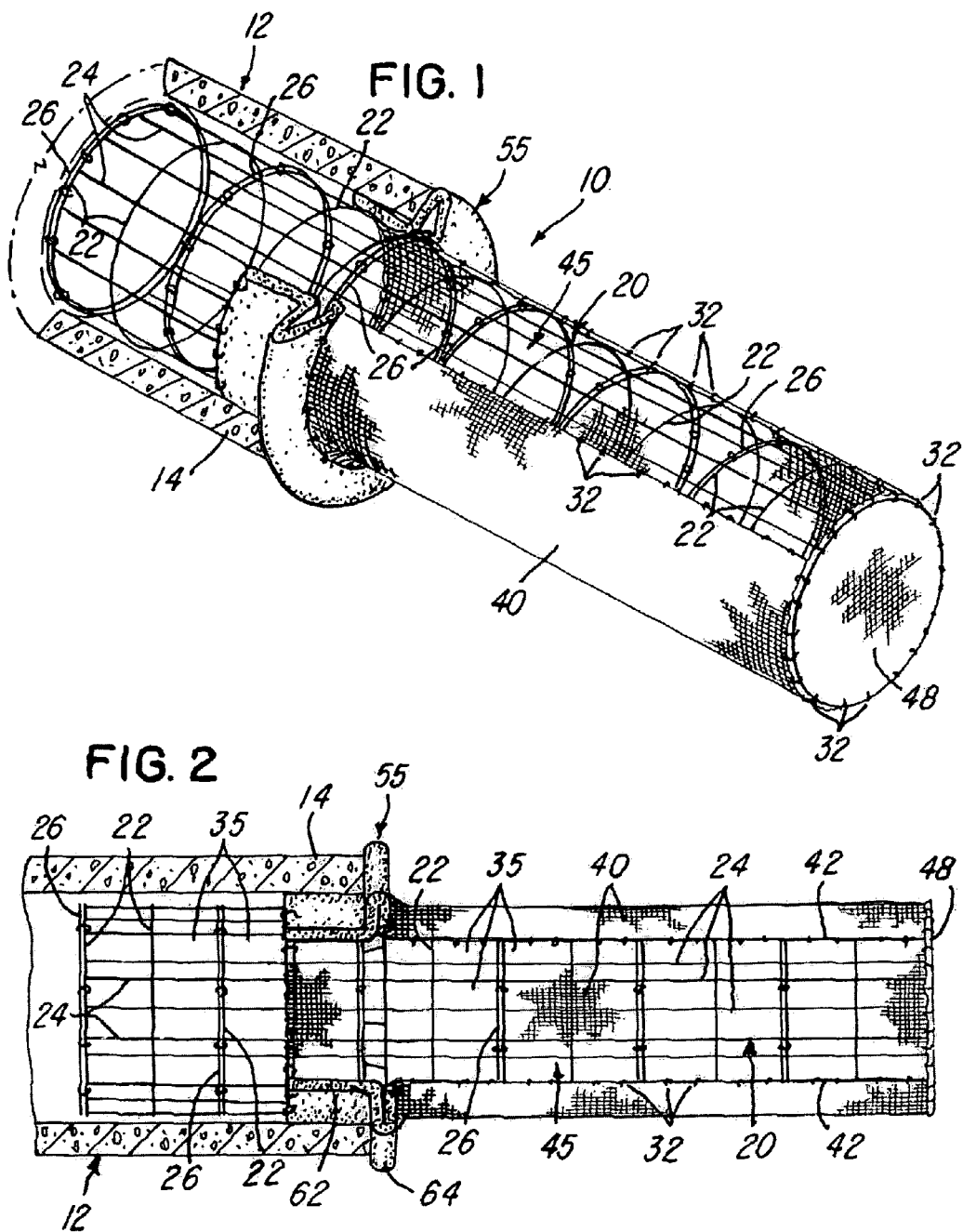

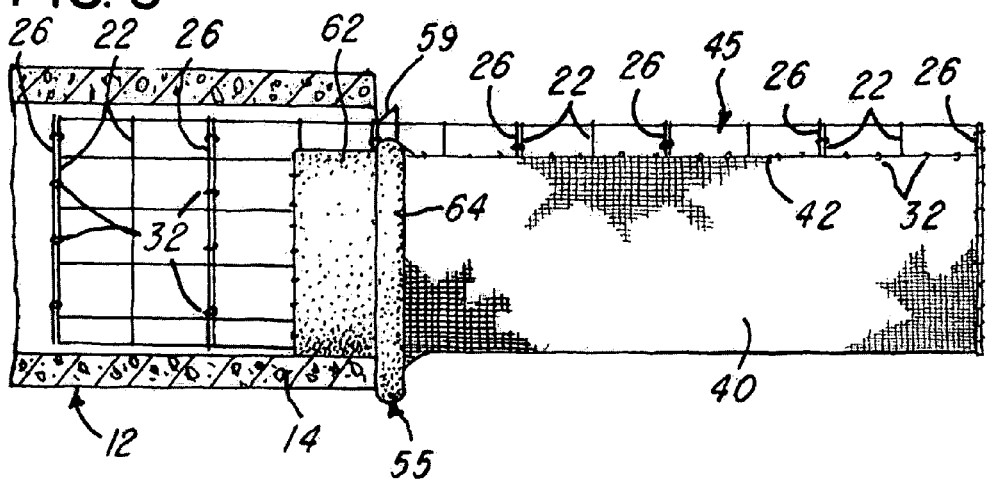
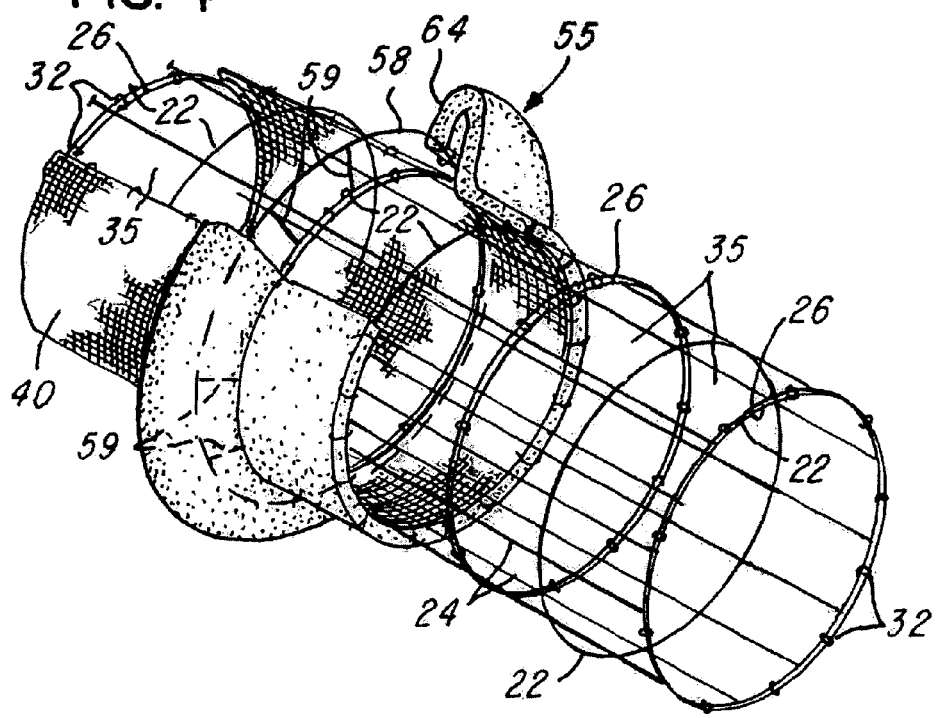

US 8,974,665 B2

SEDIMENT FILTER SYSTEM FOR A STORM WATER PIPE

BACKGROUND OF THE INVENTION

In the development of a residential housing project or a commercial building project, storm water culvert pipes are frequently installed, and erosion control means are temporarily installed to impede storm water from carrying silt and other sediment into a storm water culvert pipe. Sediment may include silt dirt, sand, rocks, sticks and other debris which is both difficult to remove from the pipe and has the potential of polluting downstream waters.

One form of culvert inlet protection is formed by constructing a U-shape or annular silt fence upstream and around the pipe inlet, for example, as disclosed in the specification sheets of the North Carolina Sediment Control Commission. Another form of culvert inlet protection is disclosed in an Urban Manual of the state of Illinois and identified as Code 808. In this form, a gravel or stone berm in a horseshoe or arcuate shape is constructed upstream and around the inlet of the storm water pipe, and the berm is tied to the culvert embankment at a predetermined spacing from the culvert pipe inlet. Other forms or devices for culvert pipe inlet protection are disclosed in U.S. Pat. No. 1,555,841, U.S. Pat. No. 3,086,655, U.S. Pat. No. 3,587,239, U.S. Pat. No. 4,713,179 and U.S. Pat. No. 7,682,104. However, these inlet protection devices are primarily used for preventing large debris and animals from entering the storm water culvert pipe.

With any device or system for preventing the flow of sediment into a culvert inlet of a storm water pipe, it is desirable for the device or system to be easily and quickly installed and removed, be relatively compact and durable, be secure with respect to the pipe inlet, be removed with little restoration of the soil or surface upstream of the inlet, and be reusable. It is apparent that none of the devices or systems referred to above for protecting a storm water culvert pipe from filling with silt or other sediment provides all of these advantages.

SUMMARY OF THE INVENTION

The present invention is directed to a filter system for use with a tubular storm water culvert pipe having an inlet portion in order to reduce significantly the flow of silt and other sediment carried by the storm water into the pipe. In a preferred embodiment, the system generally includes an elongated tubular frame preferably formed by rolling a welded wire mesh. The frame has an inner portion sized to project into the inlet portion of a storm water pipe and an elongated outer portion projecting upstream from the inlet portion of the pipe. A flexible silt filter material, such as a filter fabric, extends around the outer portion of the frame and provides for collecting sediment on the ground or surface laterally outwardly around the outer portion of the frame. In one embodiment, a collar member includes a flexible porous material and is attached to the frame to limit or stop further movement of the frame into the inlet portion of the pipe and also form a silt filter between the frame and the pipe inlet. Preferably, the outer portion of the wire mesh frame has a top portion which is not covered by the filter material in order to define an overflow opening along the top portion of the frame to provide for directing storm water with no silt or light silt and flowing above the filter material on the frame into the inlet portion of the storm water pipe.

Other features and advantages of the invention will be apparent from the following description, the accompanying drawings and the appended claims.

BRIEF DESCRIPTION OF THE DRAWINGS

FIG. 1 is a perspective view of a filter system constructed in accordance with the invention and having an end portion projecting into an inlet portion of a storm water culvert pipe;

FIG. 2 is a top view of the filter system shown in FIG. 1 and with the pipe inlet portion shown in horizontal cross-section;

FIG. 3 is an elevational view of the filter system installed within the storm water pipe shown in vertical cross-section;

FIG. 4 is a fragmentary perspective view of the inner end portion of the filter system and which projects into the culvert pipe.

DESCRIPTION OF THE ILLUSTRATED EMBODIMENT

Figure 5:
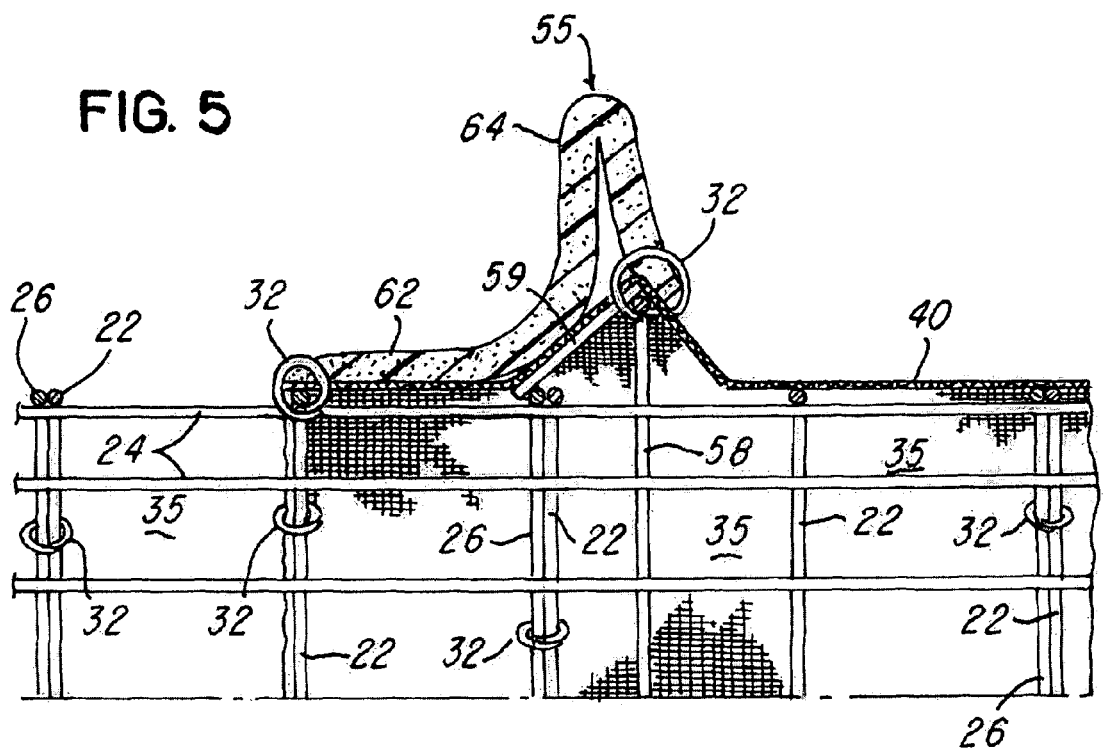
FIG. 5 is an enlarged fragmentary section of the portion of the filter system shown in FIG. 4 and showing the construction of a collar member for engaging the end of the culvert pipe.

FIG. 1 illustrates a filter system 10 constructed in accordance with the invention for use with an installed storm water culvert pipe 12 having an inlet portion 14. The conventional culvert pipe 12 may be formed of various materials, such as concrete as shown or corrugated metal pipe or plastic pipe which may be corrugated. The tubular pipe 12 is usually cylindrical and varies in size, for example, with inside diameters ranging from 6 inches to 24 inches. The pipe 12 may also be non-cylindrical such as oval or arcuate with a generally flat bottom portion.

The filter system 10 generally includes an elongated generally tubular frame 20 which is preferably formed by rolling a welded wire mesh into a tube so that cross wires 22 become annular or cylindrical ring wires and longitudinal wires 24 extend axially with the wires 24 welded to the cross wires 22. The rolled welded wire frame 20 is secured or maintained in its tubular form by a plurality of annular or circular sizing wire rings 26 which extend around the rolled wire mesh and are secured or fastened to alternate peripherally extending annular wire rings 22 by fasteners 32, preferably in the form of deformable wire clips or small rings which are clamped around the adjacent annular wires 22 and 26.

The length of the tubular frame 20 and the cross-sectional width or diameter of the frame, may vary depending upon the type of soils and the desired efficiency of the filter system. The rolled welded wire mesh defines rectangular openings 35 between the peripherally extending wires 22 and the axially extending wires 24 through which storm water may flow into the inlet portion 14 of the culvert pipe 12. As shown in FIGS. 1-3, one end portion or the inner portion of the tubular frame 20 projects into the inlet portion 14 of the culvert pipe 12, and the opposite or outer end portion of the frame 20 projects axially outwardly from the inlet portion 14 of the pipe.

As also shown in FIGS. 1-3, a flexible and porous filter material or fabric 40 is attached to the outer portion of the frame 20 and also part of the inner portion of the frame within the culvert pipe 12. The porous flexible filter material or fabric 40 is preferably a geotextile fabric commonly used for making a silt fence since the pores are sufficiently small to block the flow of silt through the fabric. The filter material or fabric 40 extends around the frame 20 and has upper longitudinally extending edge portions 42 which are attached to upper longitudinally extending wires 24 of the frame by longitudinally or axially spaced fasteners or wire clips 32. The upper parallel edge portions 42 of the filter fabric 40 define a longitudinally extending overflow opening 45 (FIGS. 1-3) which extends along the length of the outer portion of the tubular frame 20. The filter material or fabric 40 also forms an end panel 48 which covers the outer end of the tubular frame 20 and has a peripheral portion secured to the adjacent rings 22 and 26 at the outer end of the frame by peripherally spaced wire rings or clips 32.

FIGS. 1-5 show a stop member or collar assembly 55 which extends around the fabric covered tubular frame 20 except for the overflow opening 45. The collar assembly 55 is located between the inner portion and the outer portion of the tubular frame 20 and projects radially outwardly to form a stop against further inward or axial movement of the frame into the inlet portion 14 of the pipe 12. As best shown in FIG. 5, the collar assembly 55 includes an annular or circular wire ring 58 which is larger in diameter than the circular wires 22 and the sizing rings 26. The ring 58 is supported concentrically with the circular wires 22 and 26 by peripherally spaced inclined support wires 59 having outer end portions welded to the wire ring 58 and inner portions either welded to one of the rings 22 or 26 or hooked around the adjacent rings. As shown in FIG. 5, the filter material or fabric 40 extends outwardly around the wire ring 58 and the inclined support wires 59 and continues axially to the next wire ring 22 where the end portion of the filter fabric 40 is secured to the ring 22 by another set of peripherally space fasteners or wire rings or clips 32.

The stop member or collar assembly 55 also includes a strip or band 62 of flexible porous filter material which extends around the wire ring 58 and over the support wires 59 and is folded over to form a double wall flexible porous flange 64 projecting radially outwardly from the tubular frame 20 covered by the filter material or fabric 40. As shown in FIGS. 1 and 2, when the inner end portion of the filter system 10 is inserted into the inlet portion 14 of the culvert pipe 12, the flexible flange 64 of the collar assembly 55 engages the end surface of the culvert pipe 12 and forms a sediment filter between the frame 20 of the filter system 10 and the culvert pipe 12. The radially outwardly projecting wire ring 58 and the support wires 59 are also effective to form a positive stop against further inward movement of the filter system axially into the inlet portion 14 of the culvert pipe.

As mentioned above, the filter system 10 is installed within a culvert pipe 12 by inserting the end portion of the frame 20 into the inlet portion 14 of the culvert pipe with the overflow opening 45 facing upwardly and the flexible flange 62 engaging the end of the pipe. The filter system then functions to filter and cause the deposition of sediment within the flowing storm water on the surface laterally outwardly of the filter material or fabric 40 wrapped around the tubular frame 20 and forming the closing end panel 48 so that the sediment does not enter the inlet portion of the culvert pipe 12. If the flow of storm water continues after depositing the sediment laterally outwardly of the filter material 40, the upper portion of the flowing storm water, which may have light silt or floating sediment, flows into the overflow opening 45 and into and through the culvert pipe 12.

From the drawings and the above description, it is apparent that a sediment filter system constructed in accordance with the invention provides desirable features and advantages. For example, the filter system 10 may be easily and quickly made in different sizes and lengths depending upon the size or diameter of the culvert pipe and the amount of sediment carried by the flow of storm water. That is, the wire mesh which forms the tubular frame 20 may be cut to form frames 20 of different lengths and rolled into different diameters and secured by welds or preformed sizing rings 26. The filter material or fabric 40 is then wrapped around and attached to the frame 20 by the wire clips 32. Thus the construction of the filter system 10 does not require expensive tooling and is primarily constructed from commercially available materials and components.

In addition, by projecting an end portion of the filter system 10 into the inlet portion of the culvert pipe, the filter system 10 is securely retained and does not require much space outwardly or upstream of the culvert pipe in order to filter the storm water flowing into the pipe. The filter system 10 may also be quickly and conveniently installed in a culvert pipe and may be quickly removed from the pipe and be reused. The filter system is also less subject to being damaged by sediment within the flowing storm water and requires little restoration of the soil or other surface materials upstream of the culvert pipe after the filter system is removed. If it is necessary to restrain the upstream end portion of the filter system 10 from upward or lateral movement, one or more stakes or sand bags may be used either within or outside the frame 20 adjacent the end filter panel 48 to hold the end portion of the frame in position.

While the form of filter system herein described and its method of construction constitute a preferred embodiment of the invention, it is to be understood that the invention is not limited to the precise form of filter system and method described, and that changes may be made therein without departing from the scope and spirit of the invention as defined in the appended claims.

The invention claimed is:

1. A filter system for use with a tubular storm water pipe for impeding the flow of sediment carried by storm water into an inlet portion of said pipe, said filter system comprising an elongated generally tubular wire frame having longitudinally extending wires and peripherally extending wires defining spaced openings through which storm water may flow, said tubular frame having an inner portion projecting into said inlet portion of said pipe and an elongated outer portion projecting outwardly from said inlet portion of said pipe, a flexible sediment filter material extending around said outer portion of said tubular frame except for a top portion of said frame defining an overflow opening and providing for collecting sediment laterally outwardly around said outer portion of said frame, a collar member separate from said tubular frame and said filter material and comprising a flexible and deformable material, said collar member extending around tubular frame and projecting radially outwardly from said frame and engaging an end surface of said inlet portion of said pipe, and said collar member forming a stop for further inward movement of said frame into said pipe and blocking the flow of sediment between said storm water pipe and said filter material extending around said frame.

2. A filter system as defined in claim 1 and including a rigid wire frame surrounding said tubular frame and extending radially outwardly from said tubular frame to support said collar member.

3. A filter system as defined in claim 2 wherein said filter material extends over said wire frame surrounding said tubular frame.

4. A filter system as defined in claim 2 wherein said rigid wire frame surrounding said tubular frame comprises a circular wire larger than said peripherally extending wires, and a plurality of peripherally spaced inclined wires connecting said circular wire to one of said peripherally extending wires.

5. A filter system as defined in claim 1 wherein said tubular frame has a generally horizontal axis and comprises a rolled wire mesh frame having said peripherally extending wires welded to said longitudinally extending wires crossing said peripherally extending wires, and a plurality of axially spaced sizing rings surrounding said rolled wire mesh frame and connected to said wires of said mesh frame to maintain said generally tubular wire mesh frame.

6. A filter system as defined in claim 1 wherein said flexible and deformable material of said collar member comprises a foam material having a thickness substantially greater than a thickness of said filter material extending around said frame.

7. A filter system for use with a tubular storm water pipe for impeding the flow of sediment carried by storm water into an inlet portion of said pipe, said filter system comprising a rolled wire mesh frame forming an elongated generally tubular wire frame having longitudinally extending wires and peripherally extending wires defining spaced openings through which storm water may flow, a plurality of axially spaced sizing rings surrounding said rolled wire mesh frame and connected to said wires of said mesh frame to maintain said generally tubular wire mesh frame, said tubular frame having an inner portion projecting into said inlet portion of said pipe and an elongated outer portion projecting outwardly from said inlet portion of said pipe, a flexible sediment filter material extending around said outer portion of said tubular frame except for a top portion of said frame defining an overflow opening and providing for collecting sediment laterally outwardly around said outer portion of said frame, a collar member separate from said tubular frame and said filter material and comprising a flexible and deformable material, said collar member extending around tubular frame and projecting radially outwardly from said frame and engaging an end surface of said inlet portion of said pipe, said collar member forming a stop for further inward movement of said frame into said pipe and blocking the flow of sediment between said storm water pipe and said filter material extending around said frame, and a rigid wire frame surrounding said tubular frame and extending radially outwardly from said tubular frame to support said collar member.

8. A filter system as defined in claim 7 wherein said filter material extends over said wire frame surrounding said tubular frame.

9. A filter system as defined in claim 7 wherein said rigid wire frame surrounding said tubular frame comprises a circular wire larger than said peripherally extending wires, and a plurality of peripherally spaced inclined wires connecting said circular wire to one of said peripherally extending wires.

10. A filter system as defined in claim 7 wherein said flexible and deformable material of said collar member comprises a foam material having a thickness substantially greater than a thickness of said filter material extending around said frame.

* * * * *